United States Patent [19]
Owens

[11] Patent Number: 6,000,730
[45] Date of Patent: Dec. 14, 1999

[54] REPLACEMENT FERRULE FOR BEAD LOCK FERRULE FITTINGS

[76] Inventor: Carl H. Owens, 5215 Phillips Hwy. #1, Jacksonville, Fla. 32207

[21] Appl. No.: 09/008,376

[22] Filed: Jan. 16, 1998

[51] Int. Cl.[6] .................................................. F16L 33/207
[52] U.S. Cl. ............................................ 285/256; 285/259
[58] Field of Search .................................... 285/256, 257, 285/251, 259

[56] References Cited

U.S. PATENT DOCUMENTS

| | | | |
|---|---|---|---|
| 1,957,440 | 5/1934 | Bijur | 285/256 |
| 1,977,219 | 10/1934 | Williams | 285/251 |
| 2,059,040 | 10/1936 | Scholtes | 285/251 |
| 2,086,703 | 7/1937 | Eastman | 285/256 |
| 2,133,313 | 10/1938 | Weatherhead, Jr. | 285/256 |
| 2,401,921 | 6/1946 | Fisher et al. | 285/256 |
| 2,570,431 | 10/1951 | Baldwin, Jr. et al. | 285/256 |
| 2,926,029 | 2/1960 | St. Clair et al. | 285/256 |
| 2,978,263 | 4/1961 | Walsh et al. | 285/256 |

*Primary Examiner*—Eric K Nicholson
*Attorney, Agent, or Firm*—Thomas C. Saitta

[57] ABSTRACT

A replacement sleeve ferrule which enables connection of a hose to a metal tube having one or a pair of preformed annular bead locks, the ferrule having a tubular extension member sized to fit over the bead locks which is then staked to the tube to secure the ferrule onto the tube, such that a hose can be joined to the tube in known fashion by crimping the sleeve ferrule onto the hose.

10 Claims, 2 Drawing Sheets

REPLACEMENT FERRULE FOR BEAD LOCK FERRULE FITTINGS

BACKGROUND OF THE INVENTION

This invention relates generally to the field of ferrules used to join to hoses made of compressible, flexible material to metal tubes, pipes or stems, and more particularly to replacement ferrules which can be attached to such tubes which are already formed with single or double beads or shoulders to lock a ferrule onto the tube, and a method of attaching such replacement ferrules to such tubes.

It is necessary in many high pressure conduits to join a flexible hose made of high-strength yet somewhat compressible material, typically a composite of polymers, rubbers and reinforcing material to a metal tube, pipe or stems. One common method and apparatus for accomplishing this is to provide a sleeve ferrule consisting of an annular sleeve with one completely open end and one partially closed end, the partially closed end having a wall perpendicular to the longitudinal axis and a circular aperture sized to match the outer diameter of the metal tube to which it is to be connected. The sleeve ferrule has relatively thin walls and is made of a malleable metal material, such as low carbon steel. The end of the tube, which may be provided with short annular flanges or beads to provide a better connection with the interior of a hose, is inserted through the circular aperture and into the body of the sleeve ferrule. Cold forming equipment is then used to create an annular bead directly to either side of the closed end ferrule wall, thereby locking the ferrule onto the tube. In other designs, a preformed single bead or shoulder may be utilized to retain a suitable fitting or ferrule, typically a pair of interlocking threaded members used in conjunction with an O-ring. A hose may then be inserted into the open end of the sleeve ferrule and onto the end of the tube, and the annular sleeve is then crimped to lock the hose, ferrule and tube together. If the hose fails, as often occurs in high pressure applications, the hose and ferrule can be cut away from the tube, but since the annular bead locks or shoulders are already in place on the tube, the hose cannot be replaced using the normal manufacturing process. This means that such hose and tube combinations cannot be repaired in the field but must be replaced with factory manufactured equipment.

It is an object of this invention to provide a means and method for repairing hose and tube combinations originally joined by a bead lock type fitting, which enables a replacement hose to be connected onto the original tube having the annular bead, shoulder or bead pair. This object is accomplished, as set forth in greater detail below, by providing a new construction for a sleeve ferrule, the new ferrule having a tubular extension joined to the closed end of the ferrule, the tubular extension being sized to fit over the annular beads and formed of a malleable material which allows the extension to be radially compressed onto the tube beyond the annular beads to affix the ferrule to the tube, thereby allowing a hose to be inserted into the ferrule and over the tube end, with the ferrule then crimped to the hose in normal manner.

SUMMARY OF THE INVENTION

The invention is in general a novel sleeve ferrule construction and a novel method for repairing a tube and hose combination, where the tube has a single or pair of preformed, annular bead or shoulder locks originally formed around or against a standard sleeve ferrule, to enable attachment of a replacement hose to the tube after removal of the original hose and ferrule. The replacement ferrule comprises a tubular, relatively thin-walled, sleeve portion made of a malleable material which may be crimped onto a hose formed of a compressible material. One end of the sleeve portion is open to receive the hose and the other end is partially closed, having a wall perpendicular to the longitudinal axis with a circular opening centered therein. Attached to the wall is a tubular extension member which extends outward from the wall a short distance. The extension is formed a malleable, metal material which is thicker and stronger than the sleeve portion. The extension is preferably joined to the sleeve portion by swaging a reduced diameter end portion of the extension against the interior of the sleeve portion.

To replace a failed hose, the original hose and ferrule are removed from the tube to expose the single or pair of annular bead locks near the end of the tube. The extension member of the replacement ferrule is inserted over the tube end, the inner diameter of the extension being chosen to allow the extension to pass over the annular beads. A staking machine is then used to radially compress or hook the extension member onto the tube on the side of the annular beads away from the tube end. Enough force is exerted to drive portions of the extension member into the tube outer wall, thus staking the extension to the tube and precluding movement in either axial direction. The replacement hose is then inserted into the open end of the sleeve portion and over the tube end. The hose is then crimped using a hose crimping machine to compress the sleeve portion onto the hose, creating a gas or fluid-tight connection between the hose and the tube.

DETAILED DESCRIPTION OF THE INVENTION

Figure 1:
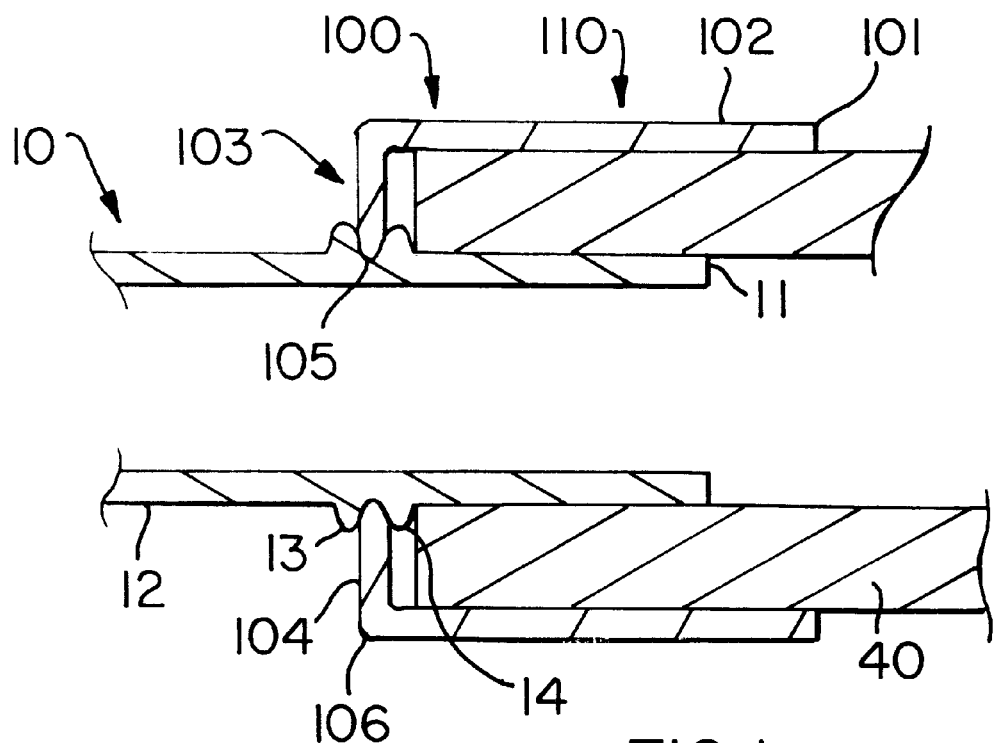
FIG. 1 is a cross-sectional illustration of prior art, showing a standard means for connecting a sleeve ferrule to a tube using a pair of annular bead locks formed after the ferrule is positioned on the tube.

With reference to the drawings, the invention will now be described in detail with regard for the best mode and the preferred embodiment. The invention comprises in general a replacement sleeve ferrule 20 used to connect a hose 40 to a tube 10 having a single bead or shoulder or a pair of preformed annular bead locks 13 and 14 (as shown in the drawings), and the method for repairing a tube and hose assembly 110 utilizing the ferrule 20.

The common mechanism used in the prior art to mount a hose 40 onto a metal tube 10 is shown in FIG. 1. A sleeve ferrule 100 is provided, this ferrule comprising an open end 101, a tubular sleeve portion 102, and a partially closed end 103 defined by a wall 104 joined to sleeve portion 102 perpendicularly to the longitudinal axis and having a centrally disposed circular aperture 105. The sleeve ferrule 100 is composed of a malleable metal material, such as low carbon steel for example, which can be deformed around hose 40, which is composed of a compressible, flexible material, typically a composite of polymer or rubber and reinforcing materials. The sleeve ferrule 100 is joined to a tube, pipe or stem 10 made of metal which has a tube end 11 and an outer wall 12. The sleeve ferrule 100 is joined to the tube 10 by inserting the tube end 11 a short distance through the aperture 105 in the closed end 103 of the sleeve ferrule 100. Beading equipment well known in the industry is then used to form a pair of annular rings or beads 13 and 14 to either side of the ferrule wall 104, such that one annular bead 13 is positioned external to the wall 104 and another is positioned internal to the wall 104, thereby precluding any movement of the ferrule 100 relative to the tube 10 in the axial direction. The hose 40 is joined to the tube 10 by inserting inside the open end 101 of the ferrule 100 and onto the end 11 of the tube 10. The sleeve portion 102 of the ferrule 100 is then compressed radially to crimp the ferrule 100 onto the hose 40, using well known techniques and equipment, locking the ferrule 100 to the hose 40 and the hose 40 to the tube 10. This mechanism and methodology creates an extremely strong, gas- or fluid-tight tube and hose assembly 101, suitable for use in high pressure applications. In circumstances where the hose 40 fails, the hose 40 and sleeve ferrule 100 of the prefabricated tube and hose assembly 101 can be removed to expose the tube 10 with the preformed annular beads 13 and 14. Alternative known constructions, not shown in the drawings, involve single beads or shoulders against which a fitting is disposed. The invention is suitable for use with any of these designs.

Figure 2:
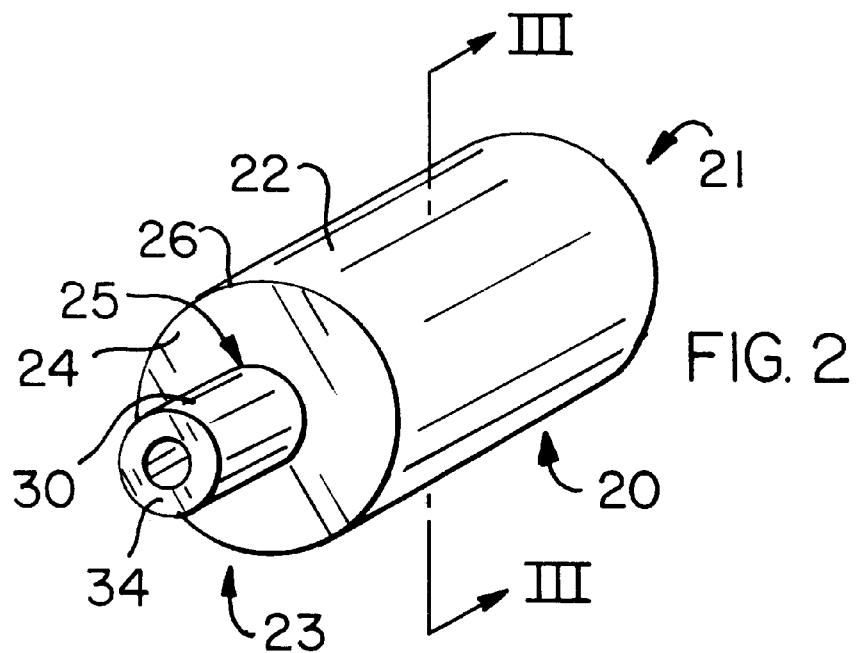
FIG. 2 is a perspective view of the ferrule of the invention.
Figure 3:
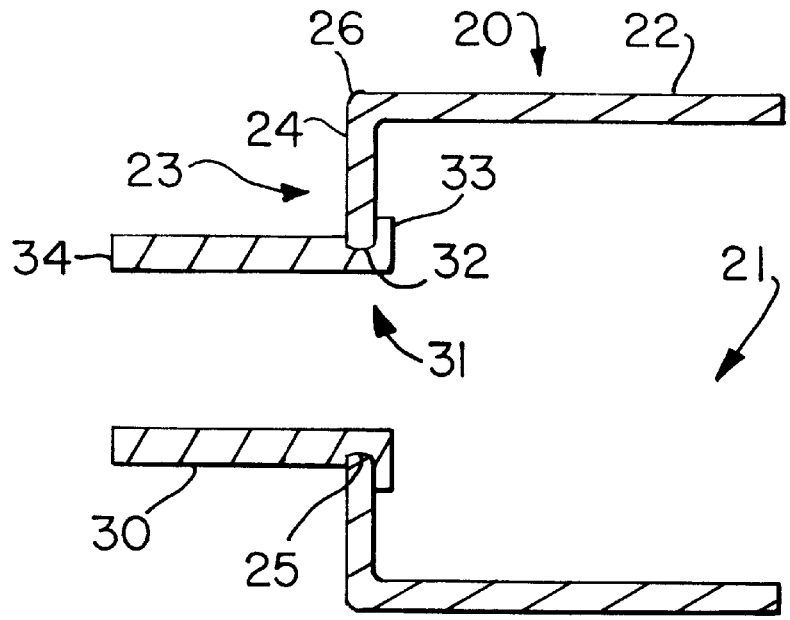
FIG. 3 is a cross-sectional view of the invention, taken along line III—III of FIG. 2, prior to attachment of the ferrule to a tube.

The replacement sleeve ferrule 20 of the invention is shown in FIGS. 2 and 3. The ferrule 20 comprises an open end 21, a tubular sleeve portion 22, and a closed end 23 defined by a wall 24 joined to the sleeve portion 22 by a shoulder 26, the wall 24 positioned perpendicularly to the longitudinal axis. A centrally located circular aperture 25 is positioned in the wall 24. This portion of the ferrule 20 is relatively thin-walled compared to the extension member 30 and is formed of a malleable metal, such as low carbon steel for example. The open end 21 is provided to receive hose 40. This portion of the sleeve ferrule 20 is substantially similar or identical to the standard sleeve ferrule 100 known in the prior art and illustrated in FIG. 1.

The ferrule 20 of the invention further comprises an extension member 30 which is composed of a malleable metal, preferably harder than the metal composing the sleeve portion 22, such as for example hot rolled carbon steel. The extension member 30 is tubular and preferably much thicker than the sleeve portion 22. The extension member 30 is joined to the closed end 23 of the ferrule 20 and extends outwardly from the wall 24 in the direction away from the ferrule open end 21 to define a free or open end 34. The extension member 30 comprises connection means 31 to affix it to the circular aperture 25, and as shown connection means 31 may comprise a groove 32 to receive the ferrule wall 24, the groove 32 being formed by swaging part of a reduced diameter segment of the extension member 30 to form a lip 33 on the internal side of wall 24, as shown in FIG. 3. The dimensions of the ferrule 20 will vary depending on the particular outer diameter of the tube 10 and the outer diameter of the hose 40, but typical dimensions for hoses 40 from 5/16 to 5/8 inches in outer diameter may include an axial length of approximately 1.25 inches for the sleeve portion 22 and approximately 0.75 inches for the extension member 30. The inner diameter of the extension member 30 is chosen dependent on the outer diameter of the annular bead locks 13 and 14, with the extension member 30 inner diameter being slightly greater than the outer diameter of the bead locks 13 and 14 such that the ferrule 20 may be slipped over the bead locks 13 and 14.

Figure 4:
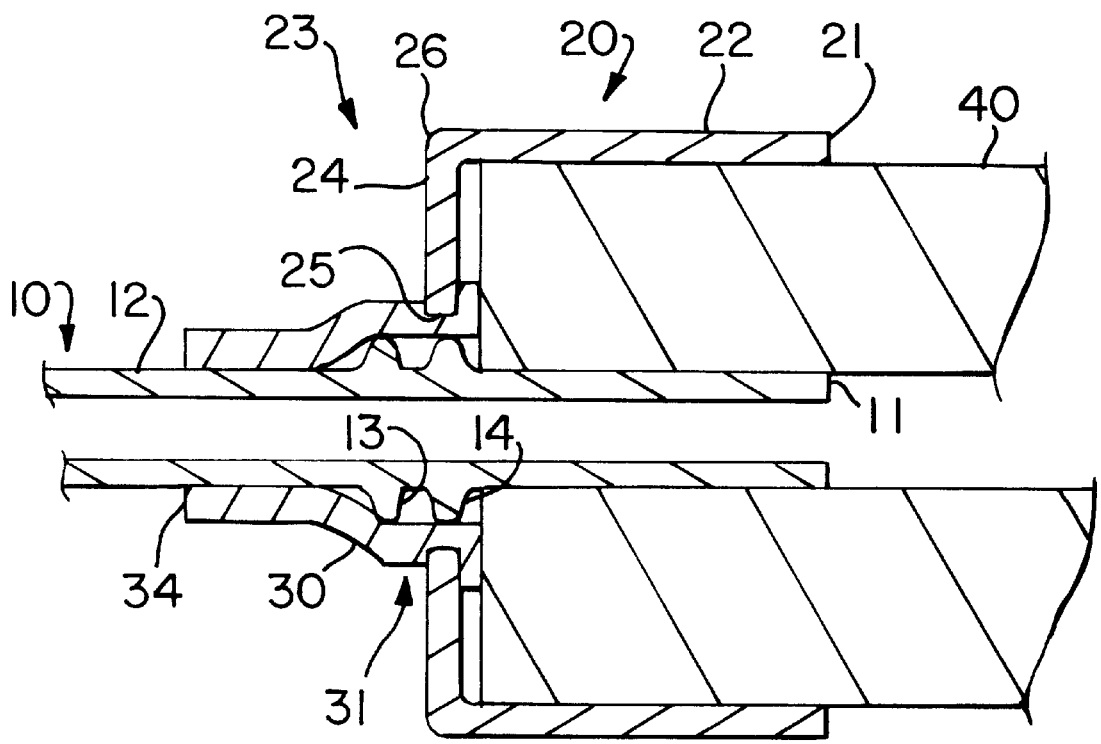
FIG. 4 is a cross-sectional view of the invention, similar to FIG. 3, showing the ferrule attached to a tube.

The replacement ferrule 20 is applied and secured as shown in FIG. 4. With the original hose 40 and ferrule 100 removed, the replacement ferrule 20 is positioned on the tube 10 by slipping the free end 34 of the extension member 30 over the tube end 11 and the annular beads 13 and 14 such that the extension member 30 is positioned beyond the beads 13 and 14, with the tube end 11 extending into the sleeve portion 22, preferably approximately even with the open end 21. Utilizing staking equipment having dies capable of exerting pressure against the circumference of the extension member 30 in the radial direction, the extension member 30 is compressed or staked onto the tube 10. Portions of the extension member 30 are preferably embedded into the outer wall 12 of the tube 10, such that the extension member 30 cannot be moved relative to the tube 10. The replacement ferrule 20 is now locked on to the tube 10, and is ready to receive hose 40. Hose 40 is inserted into the open end 21 of ferrule 20 and onto tube end 11. The sleeve portion 22 of the ferrule 20 is then crimped onto the hose 40 in known manner, compressing the hose 40 against the tube 10 to form a secure connection.

It is contemplated that equivalents and substitutions for certain elements or steps set forth above may be obvious to those skilled in the art, and the true scope and definition of the invention therefore is to be as set forth in the following claims.

I claim:

1. A tube and hose assembly comprising a metal tube having at least one raised annular bead adjacent an end, a hose formed of a compressible material and mounted onto said tube end but not over said at least one annular bead, and a sleeve ferrule comprising a radially compressed sleeve portion formed of a malleable metal and having an open end to receive said hose and a closed end defined by a wall having a circular aperture joined to said sleeve portion by a shoulder, and a radially compressed tubular extension member formed of a malleable metal and joined to said wall at said circular aperture and extending away from said open end, said extension member having a free end to receive said metal tube, where said free end of said extension member is positioned to the opposite side of said at least one annular bead from said tube end such that said metal tube passes into said free end and completely through said extension member, and said tube end extends into said sleeve portion and said hose, and said extension member is radially compressed onto said tube on said opposite side of said at least one annular bead from said tube end to connect said extension member to said tube and said sleeve portion is compressed onto said hose to connect said hose to said tube.

2. The assembly of claim 1, where said extension member is thicker than said sleeve portion.

3. The assembly of claim 3, where said extension member is joined to said wall by connection means comprising a groove and lip, said groove receiving said wall and said lip abutting said wall.

4. The assembly of claim 1, where said sleeve portion is composed of low carbon steel and said extension member is composed of hot rolled carbon steel.

5. The assembly of claim 1, where said metal has a pair of annular beads.

6. A method of joining a hose composed of a compressible material onto a metal tube having at least one preformed raised annular bead adjacent an end comprising the steps of providing a hose, a metal tube having at least one preformed annular bead adjacent an end, and a sleeve ferrule comprising a sleeve portion formed of a malleable metal and having an open end to receive said hose and a closed end defined by a wall having a circular aperture joined to said sleeve portion by a shoulder, and a tubular extension member formed of a malleable metal and joined to said wall at said circular aperture and extending away from said open end, said extension member having a free end to receive said metal tube, positioning said extension member onto said tube such that said tube extends into said free end and completely through said extension member and said free end of said extension member is on the opposite side of said at least one annular bead from said tube end and said tube end extends into said sleeve portion, radially compressing said extension member on said opposite side of said at least one annular bead from said tube end to connect said extension member to said tube, inserting said hose into said sleeve portion and onto said tube end but not over said at least one annular bead, and radially compressing said sleeve portion to connect said hose to said tube.

7. The method of claim 6, where said step of providing a metal tube further comprises initially providing said metal tube with an attached ferrule and attached hose, and further comprising the step of removing said attached ferrule and attached hose prior to positioning said extension member onto said tube.

8. The method of claim 6, where said step of radially compressing said extension member onto said tube includes embedding portions of said extension member into said tube.

9. The method of claim 6, further comprising the step of forming said sleeve ferrule by providing said extension member with a reduced diameter end, inserting said reduced diameter end through said circular aperture of said closed end of said sleeve portion, and swaging said reduced diameter end against said wall to secure said extension member to said sleeve portion.

10. The assembly of claim 1, where portions of said extension member are embedded into said tube.

* * * * *